(12) United States Patent
Schust

(10) Patent No.: US 7,686,515 B2
(45) Date of Patent: Mar. 30, 2010

(54) RADIALLY MOBILE BEARING FOR A SHAFT PERTAINING TO A STEERING SYSTEM

(75) Inventor: Achim Schust, Gaildorf (DE)

(73) Assignee: ZF Lenksysteme GmbH, Schwaebisch Gmuend (DE)

( * ) Notice: Subject to any disclaimer, the term of this patent is extended or adjusted under 35 U.S.C. 154(b) by 134 days.

(21) Appl. No.: 12/009,884

(22) Filed: Jan. 23, 2008

(65) Prior Publication Data

US 2008/0199114 A1    Aug. 21, 2008

Related U.S. Application Data

(63) Continuation of application No. PCT/EP2006/063691, filed on Jun. 29, 2006.

(30) Foreign Application Priority Data

Jul. 27, 2005    (DE) .................. 10 2005 035 020

(51) Int. Cl.
*F16C 27/06*    (2006.01)
*F16C 33/02*    (2006.01)
*B62D 1/16*    (2006.01)

(52) U.S. Cl. .................. 384/220; 384/215; 384/275; 384/296; 384/536; 74/492

(58) Field of Classification Search .......... 384/99, 384/220, 535–536, 581–582, 215, 275, 296; 74/492

See application file for complete search history.

(56) References Cited

U.S. PATENT DOCUMENTS

| 5,033,875 | A  | * | 7/1991  | Moulinet ............. 384/536 |
| 5,669,718 | A  |   | 9/1997  | Sakairi et al. |
| 5,675,456 | A  | * | 10/1997 | Myers ............. 360/265.6 |
| 6,044,723 | A  |   | 4/2000  | Eda et al. |
| 6,435,050 | B1 |   | 8/2002  | Tanke, II et al. |
| 6,439,337 | B1 |   | 8/2002  | Ballester |
| 6,550,567 | B2 | * | 4/2003  | Murakami et al. ...... 384/536 |
| 6,769,507 | B2 |   | 8/2004  | Murakami et al. |
| 2003/0127277 | A1 |   | 7/2003  | Murakami et al. |
| 2004/0084865 | A1 |   | 5/2004  | Kitami et al. |
| 2005/0161277 | A1 |   | 7/2005  | Bock et al. |

FOREIGN PATENT DOCUMENTS

| DE | 198 22 478  | 12/1998 |
| DE | 103 25 518  | 12/2004 |
| EP | 0 719 695   | 7/1996  |
| WO | WO-03/086836 | 10/2003 |

* cited by examiner

*Primary Examiner*—Marcus Charles
(74) *Attorney, Agent, or Firm*—Jordan and Hamburg LLP

(57) ABSTRACT

A radially movable bearing for a shaft of a gear in a steering system includes a bush or outer ring that is supported in a receiving element of a mount or housing for the gear. In order to create a radially flexible bearing for the shaft of the gear, which movable bearing enables quiet operation for the entire service life of the gear, the outer ring or the bush is held by at least one support element that is inserted in a gap between the receiving element and the outer ring, and that is made of a material with elastomer behavior.

4 Claims, 1 Drawing Sheet

RADIALLY MOBILE BEARING FOR A SHAFT PERTAINING TO A STEERING SYSTEM

BACKGROUND OF THE INVENTION

The invention relates to a radially movable bearing for a shaft of a gear in a steering system.

In gearboxes of steering systems, in particular, in rack-and-pinion gears or worm gears, shafts having driving wheels such as pinions or worms are borne in one fixed bearing and in one radially movable bearing. The movable bearing has the freedom to permit the driving wheel to roll on the driven wheel or a rack using a pressing device. The pressing device also compensates wear between the driving wheel and the driven wheel or the corresponding denticulation between the wheels. However, in order to enable low-friction adjustment of the movable bearing, in terms of design, transverse clearance should be provided, relative to the amount of freedom, between the outer ring of the movable bearing and a receiving element for the movable bearing in a gear housing of the gear. This leads to noise, in particular when the direction of rotation of the shafts changes, for instance in steering gears when there is a change in the direction of travel.

US 2004/0084865 A1 describes an electrical steering system, the actuator of which forms an electromotor having a flange-connected worm gear. A shaft that is arranged rotation-fast with a cylindrical worm in a gear housing is borne via two roller bearings as fixed bearings. In order to prevent noise from the denticulation between the cylindrical worm and the worm wheel, the publication suggests arranging an elastic coupling layer between the shaft and the cylindrical worm.

This design measure is complex in terms of production engineering and is not able to compensate wear in the denticulation.

The underlying object of the invention is to create a radially movable bearing for a shaft of a gear in a steering system, which movable bearing enables quiet operation for the entire service life of the gear.

SUMMARY OF THE INVENTION

The object is attained using a radially movable bearing, in that provided between the outer ring or a bush that seals the radially movable bearing to the outside and the receiving element in the gear housing is a gap in which is inserted a support element made of a material with elastomer properties, the outer ring of the radially movable bearing can be held in the receiving element such that it does not have any metal contact with the receiving element in the gear housing, but rather in particular it is supported and held transverse to its freedom exclusively using the support element that transmits the tension and pressure and that is made of the material with elastomer behavior. Elastomer behavior shall be construed to mean rubber-elastic behavior that in the unstressed state enables a defined configuration of a workpiece and whereby the workpiece returns to the defined configuration even after severe deformation.

It is useful to arrange the support element in the gap such that it is arranged approximately transverse to the freedom of the radially movable bearing and preferably in this manner forms a pivot bearing, the pivot axis of which is approximately parallel to the longitudinal axis of the shaft or of the radially movable bearing. The support element made of a material with elastomer behavior is fixed in a press fit and/or in a form fit on the outer ring or on the bush of the radially movable bearing and on the receiving element.

In order to simplify assembly of the support element made of a material with elastomer behavior, the support element can be formed in a single piece with an inner ring that surrounds the outer ring or the bush of the radially movable bearing. During assembly in the gear housing, the movable bearing is thus guided together with the inner ring and the support element into the receiving element. A support ring or an otherwise created lining of the receiving element can itself be arranged in the receiving element of the mount or housing for the gear. The support ring is preferably made from material with elastomer behavior and can be formed in a single piece with the support element and the inner ring as a component forming a single-piece pivot bush. The movable bearing is fixed in the inner ring of the pivot bush.

In order to protect against any relaxation in the material with elastomer behavior, the support element and/or the inner ring and/or the support ring can have a structural reinforcement, for example, including a metal lattice or fiber reinforcement, preferably made of synthetic fibers.

The outer surfaces of the support element that run in the axial direction can preferably be concave and extend approximately across the entire axial length of the pivot bush.

The support ring and/or the inner ring of the pivot bush can be adapted in terms of their configuration to the movable bearing or receiving element in a gear housing and can fundamentally have configuration features that enable different wall thicknesses or connections or the same guided connection. The support ring or even the inner ring of the pivot bush can for instance have areas with greater wall thicknesses that can act as a noise-damping stop when the inner ring pivots with the movable bearing.

In order to be able to exert a radial pressing force on the movable bearing, the support ring and the inner ring of the pivot bush each have at least one passage that makes it possible for a thrust member end of a thrust member to act directly on the outer ring or the bush of the movable bearing.

The radially movable bearing with pivot bush according to the invention is suitable for bearing a shaft of a worm gear or a rack-and-pinion gear, whereby the worm gear can be part of an electrical actuator of an electrical power-assisted steering or power steering system.

The material with elastomer behavior can be a thermoplastic like an injection molding plastic, a duroplastic with elastic properties, or an elastomer. The entire pivot bush can be produced from such plastics, also with fiber or metal lattice reinforcement, as a single piece in an injection molding process or in another suitable process.

Any desired suitable structural form of a slide bearing or even of a roller bearing can be used for the movable bearing.

One exemplary embodiment is depicted in the following using the drawings.

DETAILED DESCRIPTION OF THE INVENTION

Figure 1:
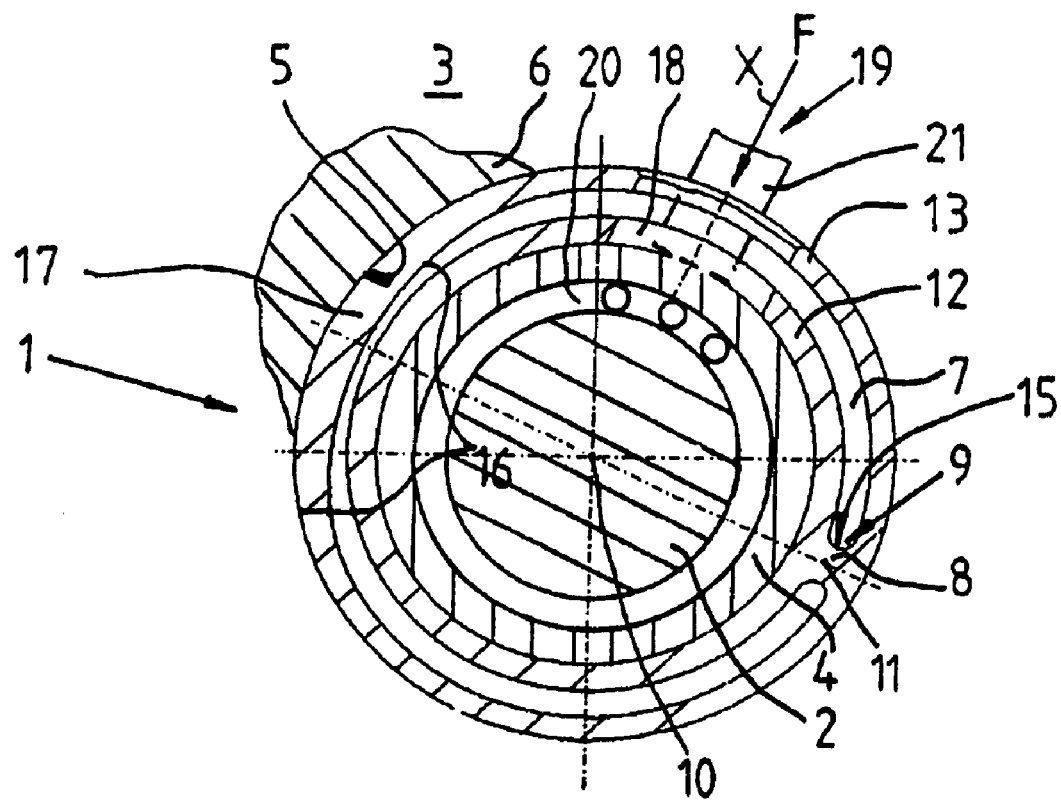
FIG. 1 is a schematic section through a radially movable bearing of a gear in a steering system.

FIG. 1 depicts in a schematic section through a mount 6 or housing of a gear 3, in which a radially movable bearing 1 that, for bearing a shaft 2, bears the one worm (not shown) of the gear 3 embodied as a worm wheel gear and to which the shaft 2 is connected rotation-fast. The radially movable bearing 1 is arranged in a receiving element 5 of the gear 3 and is acted upon by a partially depicted pressing device 19, more precisely, by a thrust member 21, in the radial direction x with a pressing force F. The worm on the shaft 2 is pressed onto denticulation of a worm wheel (not shown) by the force F.

Figure 2:
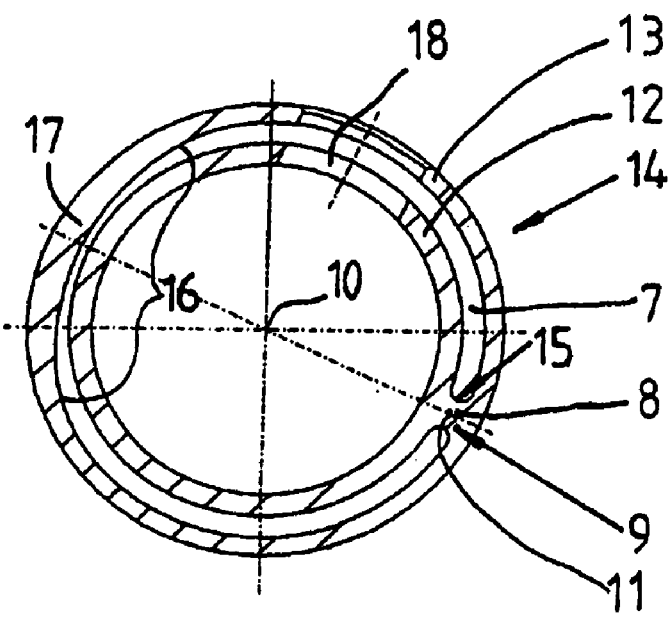
FIG. 2 is a section through a pivot bush in FIG. 1.

The radially movable bearing is embodied as a roller bearing 20, an outer ring 4 of the roller bearing 20 being held in an inner ring 12 of a pivot bush 14 (see FIG. 2) and being made of a material with elastomer behavior. The inner ring 12 is connected via a single support element 8 to a support ring 13 that surrounds the inner ring 12. In the exemplary embodiment depicted in FIGS. 1 and 2, the inner ring 12, the support element 8, and the support ring 13 are formed in a single piece made of an injection molding plastic. The inner ring 12 can move about a pivot axis 11, which runs through the support element 8, within a gap 7 between the support ring 13 and the inner ring 12. In this manner the support element 8 forms a pivot bearing 9 for the radially movable bearing 1.

The support element 8 provides support for transverse forces, transverse to the freedom of the radially movable bearing 1 depicted by the arrow x, in particular when the direction of rotation of the shaft 2 and of the worm attached thereto changes. The support element 8 transfers tension and pressure such that no noise is created. The pivot axis 11 in the support element 8 runs parallel to the longitudinal axis 10 of the shaft 2. The support element 8 has concave outer surfaces 15 that prevent cracks from forming. The thrust member 21 passes through a passage 18 into the support ring 13 and the inner ring 12 of the pivot bush 14 with radial clearance. The thrust member 21 can also be supported on the inner ring 12 so that in this case it passes through only the support ring 13. The wall thickness in one circumferential area 16 of the support ring 13 is reinforced on a side of the support ring 13 that opposes the support element 8. This area forms a stop 17 for the inner ring 12 on the support ring 13.

LIST OF REFERENCE SYMBOLS

1 Radially movable bearing
2 Shaft
3 Gear
4 Outer ring
5 Receiving element
6 Mount
7 Gap
8 Support element
9 Pivot bearing
10 Longitudinal axis
11 Pivot axis
12 Inner ring
13 Support ring
14 Pivot bush
15 Outer surface
16 Area
17 Stop
18 Passage
19 Pressing device
20 Roller bearing
21 Thrust member
x Arrow
F Force

The invention claimed is:

1. A radially movable bearing for a shaft of a gear in a steering system, comprising:

an outer ring which is retainable in a receiving element of a mount or housing for said gear with a gap being defined between said outer ring and said receiving element;

a support element that is inserted in the gap between said receiving element and said outer ring, said support element being made of a material with elastomeric characteristics, said outer ring being held by said support element, said support element being embodied as a pivot bearing having a pivot axis that runs approximately parallel to a longitudinal axis of said shaft;

a pivot bush including an inner ring and a support ring, said inner ring and/or said support ring including a passage in a radial direction of said radially movable bearing; and a pressing device for said shaft, said passage receiving said pressing device therethrough.

2. A radially movable bearing for a shaft of a gear in a steering system, comprising:

an outer ring which is retainable in a receiving element of a mount or housing for said gear with a gap being defined between said outer ring and said receiving element;

a support element that is inserted in the gap between said receiving element and said outer ring, said support element being made of a material with elastomeric characteristics, said outer ring being held by said support element, said support element being embodied as a pivot bearing having a pivot axis that runs approximately parallel to a longitudinal axis of said shaft;

an inner ring being fixed on said outer ring, said inner ring being comprised of a material with elastomeric characteristics; and a support ring which is comprised of the material with elastomeric characteristics, said support ring being fixed in said receiving element of said mount or said housing for said gear;

said inner ring, said support element, and said support ring are formed in a single piece from the material with elastomer behavior and comprise a single-piece pivot bush for said radially movable bearing, said support element extends approximately across an entire axial length of said pivot bush.

3. A radially movable bearing for a shaft of a gear in a steering system, comprising:

an outer ring which is retainable in a receiving element of a mount or housing for said gear with a gap being defined between said outer ring and said receiving element;

a support element that is inserted in the gap between said receiving element and said outer ring, said support element being made of a material with elastomeric characteristics, said outer ring being held by said support element, said support element being embodied as a pivot bearing having a pivot axis that runs approximately parallel to a longitudinal axis of said shaft;

a support ring which is comprised of a material with elastomeric characteristics, said support ring being fixed in said receiving element of said mount or said housing for said gear, said support element being supported on said support ring, at least one of said support ring or said inner ring of said pivot bush has varying wall thicknesses.

4. A radially movable bearing according to claim 3, wherein at least one of said support ring or said inner ring of said pivot bush includes at least one area having greater wall thickness which acts as a stop for said inner ring.

* * * * *